United States Patent [19]

Anderson

[11] Patent Number: 5,058,049

[45] Date of Patent: Oct. 15, 1991

[54] COMPLEX SIGNAL TRANSFORMATION USING A RESISTIVE NETWORK

[75] Inventor: Howard C. Anderson, Tempe, Ariz.

[73] Assignee: Motorola Inc., Schaumburg, Ill.

[21] Appl. No.: 403,540

[22] Filed: Sep. 6, 1989

[51] Int. Cl.$^5$ .............................................. G06G 7/02
[52] U.S. Cl. ...................................... 364/826; 364/827
[58] Field of Search ............... 364/826, 807, 513, 604, 364/725, 827, 726

[56] References Cited

U.S. PATENT DOCUMENTS

| | | | |
|---|---|---|---|
| 3,851,162 | 11/1974 | Munoz | 364/827 |
| 4,106,103 | 8/1978 | Perreault | 364/827 |
| 4,161,785 | 7/1979 | Gasparek | 364/827 |
| 4,719,591 | 1/1988 | Hopfield et al. | 364/807 |
| 4,737,929 | 4/1988 | Denker | 364/807 |
| 4,782,460 | 11/1988 | Spencer | 364/807 |
| 4,901,271 | 2/1990 | Graf | 364/807 |

*Primary Examiner*—Jerry Smith
*Assistant Examiner*—Jim Trammell
*Attorney, Agent, or Firm*—Robert D. Atkins

[57] ABSTRACT

A resistive network is responsive to a spatial vector formed by sampling an input signal for providing the simultaneous complex transformation thereof at a plurality of outputs. A matrix representation of the sum of products estimation of the complex transform provides the connection scheme and the individual values for the resistors comprising the resistive network. These resistors are interconnected in a meshwork of first and second conductors with a predetermined correspondence between the resistor network and the elements of the matrix of the sum of products estimation. Inverters are coupled to predetermined ones of the plurality of first conductors for inverting the polarity of predetermined elements of the spatial vector of the input signal wherein the predetermined ones of said plurality of first conductors are identified from the matrix of the sum of products estimation. In the transformation, the spatial vector of the input signal is applied to the plurality of first conductors. The predetermined connection scheme and the predetermined values of the resistive network converts the spatial vector of the input signal to a plurality of signals flowing through the plurality of second conductors for providing a spatial vector output signal proportional to the complex transformation of the input signal.

11 Claims, 2 Drawing Sheets

COMPLEX SIGNAL TRANSFORMATION USING A RESISTIVE NETWORK

BACKGROUND OF THE INVENTION

This invention relates in general to complex signal transformations, and more particularly, to a resistive network for performing a simultaneous complex transformation of the spatial vector formed by sampling an input signal.

Complex signal transformations such as the Fourier, Laplace and convolution integrals are routinely encountered in modern signal processing. The Fourier transform, for example, is used to convert data from one dimension, typically time domain, into another dimension, frequency domain. This conversion is advantageous in that once the data is converted to the appropriate dimension, the individual components of that dimension may be easily manipulated to achieve the desired result. The fast Fourier transform (FFT) and the discrete Fourier transform (DFT) are conventional estimations of the Fourier integral typically calculated through sequential iterations of the input data. Likewise, the inverse discrete Fourier transform (IDFT), which transposes the data back to the original dimension, is also computed in a serial fashion.

The serial transformation is still desirable in some signal processing applications wherein a precise quantitative output is required. However, many input signals are real time in nature and the conventional sequential numeric processing of the DFT, or for that matter, any other complex transformation, creates a bottleneck in the signal path limiting the bandwidth of the input signal. Applications such as speech and pattern recognition and video image processing are much more concerned with data throughput than numeric precision, and as such, are ideal candidates for the inherent parallel processing techniques of neural networks.

Thus, what is needed is a parallel processing technique to improve the data throughput of a complex transform.

SUMMARY OF THE INVENTION

Accordingly, it is an object of the present invention to provide an improved technique of complex signal transformation.

A further objective of the present invention is to provide an improved technique of complex signal transformation comprising a resistive network having a plurality of inputs and a plurality of outputs.

Another objective of the present invention is to provide an improved technique of complex signal transformation wherein the elements of a spatial vector of an input signal are transformed simultaneously.

Yet another objective of the present invention is to provide an improved technique of complex signal transformation wherein the DFT of the input signal is provided through a predetermined connection scheme of the resistive network from the coefficients of the sum of products estimation of the DFT.

Still another objective of the present invention is to provide an improved technique of performing the DFT wherein the coefficients of the sum of products estimation of the DFT are inversely proportional to the resistor values of the resistive network.

In accordance with the above and other objectives, there is provided a resistive network for providing the complex transformation of an input signal at an output thereof, comprising a first circuit responsive to the input signal and having a plurality of tap points for providing a signal vector representative of the state space of the input signal; a plurality of first and second conductors wherein the plurality of first conductors are coupled in a predetermined manner to the plurality of tap points; a second circuit coupled between the plurality of second conductors and the output; a plurality of resistors each having predetermined a value and a predetermined connection scheme between both the plurality of first conductors and the plurality of second conductors wherein the predetermined connection scheme and the predetermined value of each of the plurality of resistors are determined from a matrix representation of the sum of the products coefficients of the complex signal transformation.

DETAILED DESCRIPTION OF THE INVENTION

Figure 1:
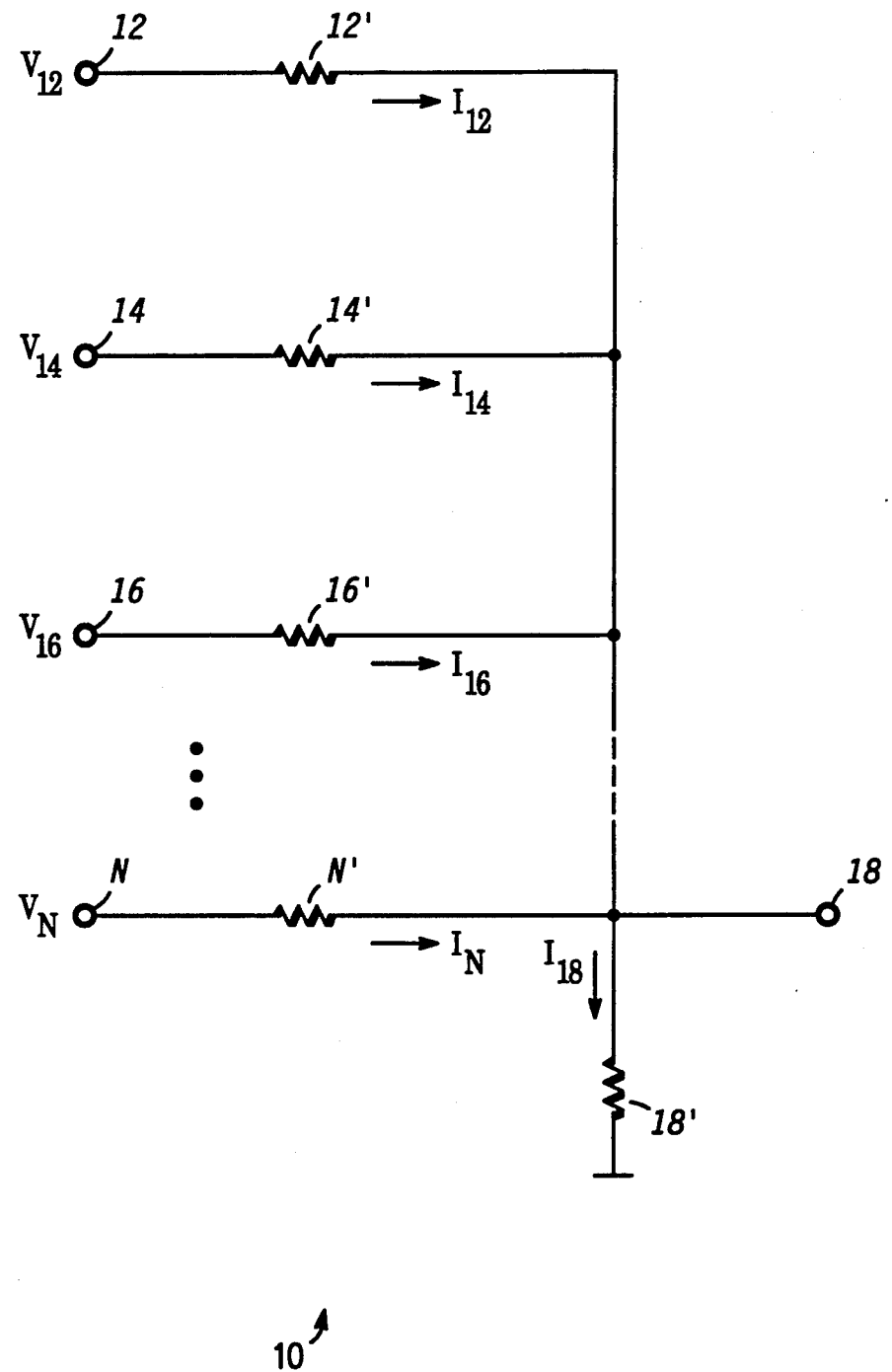
FIG. 1 is a schematic diagram of a resistive network useful in the explanation of the present invention.

The present invention is applicable to any complex signal transformation which may be expressed as a sum of products, and therefore may be represented in matrix notation. This includes many complex transforms since mathematical estimations generally exist for most complex integrations in terms of the sum of products notation. These estimations are acceptable in many applications wherein a relatively small degree of error may be neglected. One such estimation of the Fourier integral is the well known DFT which may be expressed as follows:

$$F_n = 1/N \sum_{k=0}^{N-1} [f_k * \exp(-j2\pi nk/N)] \quad (0 \leq n \leq N - 1) \quad (1)$$

where:
N = integer number of samples of the complex input
j = complex coefficient (square root of −1)
k = integer sample number of the complex input
n = integer sample number of the complex output
$f_k$ = kth sample of the complex input
$F_n$ = nth sample of the transformed complex output Equation (1) may be expanded into real and imaginary components, including the substitution of $\omega_{nk} = \exp(-j2\pi nk)$, as follows:

$$Re(F_n) = 1/N \sum_{k=0}^{N-1} [Re(\omega_{nk}) * Re(f_k) - Im(\omega_{nk}) * Im(f_k)] \quad (2)$$

$$Im(F_n) = 1/N \sum_{k=0}^{N-1} [Re(\omega_{nk}) * Im(f_k) + Im(\omega_{nk}) * Re(f_k)] \quad (3)$$

where:
Re( ) = real part of the argument
Im( ) = imaginary part of the argument

Equations (2) and (3) are in terms of a sum of products and as such may be expanded and expressed in vector and matrix notation as shown in equation (4):

$$\begin{bmatrix} F_R \\ F_I \end{bmatrix} = 1/N \begin{bmatrix} [\omega_R] & -[\omega_I] \\ [\omega_I] & [\omega_R] \end{bmatrix} \begin{bmatrix} f_R \\ f_I \end{bmatrix} \quad (4)$$

where:

$[\omega_R]$ = matrix of real components of $\omega_{nk}$ $[\omega_I]$ = matrix of imaginary components of $\omega_{nk}$ $f_R$ = real column input vector whose components are $\text{Re}(f_k)$ for $(0 \leq k \leq N-1)$ $f_I$ = real column input vector whose components are $\text{Im}(f_k)$ for $(0 \leq k \leq N-1)$ $F_R$ = real column output vector whose components are $\text{Re}(F_n)$ for $(0 \leq n \leq N-1)$ $F_I$ = real column output vector whose components are $\text{Im}(F_n)$ for $(0 \leq n \leq N-1)$ Equation (4) provides the basis for preforming the DFT, including all complex operations, in one matrix multiplication. For example, selecting the simple case with two samples of the complex input signal (N=2), equation (4) provides the following result:

$$\begin{bmatrix} Re(F_0) \\ Re(F_1) \\ Im(F_0) \\ Im(F_1) \end{bmatrix} = \quad (5)$$

$$1/2 \begin{bmatrix} Re(\omega_{00}) & Re(\omega_{01}) & -Im(\omega_{00}) & -Im(\omega_{01}) \\ Re(\omega_{10}) & Re(\omega_{11}) & -Im(\omega_{10}) & -Im(\omega_{11}) \\ Im(\omega_{00}) & Im(\omega_{01}) & Re(\omega_{00}) & Re(\omega_{01}) \\ Im(\omega_{10}) & Im(\omega_{11}) & Re(\omega_{10}) & Re(\omega_{11}) \end{bmatrix} \begin{bmatrix} Re(f_0) \\ Re(f_1) \\ Im(f_0) \\ Im(f_1) \end{bmatrix}$$

The elements of the synoptic weighting matrix $\omega$ may then be evaluated from the original substitution of $\omega_{nk} = \exp(-j2\pi nk)$, or equivalently, $\omega_{nk} = \cos(2\pi nk) - j\sin(2\pi nk)$. For example, $\text{Re}(\omega_{00})$ reduces to $\cos(0)$ and $\text{Re}(\omega_{11})$ becomes $\cos(2\pi)$ both of which are equal to one. Hence, the transformed output column vector $F_n$ is calculated from the sum of products of the synoptic weighting matrix $\omega$ and the input vectors $f_k$, for example, $\text{Re}(F_0)$ is calculated in equation (6) as:

$$Re(F_0) = \tfrac{1}{2} [Re(\omega_{00})^* Re(f_0) + Re(\omega_{01})^* Re(f_1) \\ - Im(\omega_{00})^* Im(f_0) - Im(\omega_{01})^* Im(f_1)] \quad (6)$$

In neural network terminology, matrix $\omega$ provides the synoptic weights coupled between the input and a processing neuron, or between interconnecting layers of neurons. The input vectors $f_R$ and $f_I$ are the input activity values for the neurons, while $f_R$ and $F_I$ are corresponding output decisions based upon the input vectors and the learning threshold of the individual neurons. Thus, for an Nth order DFT, the system would have 2*N neurons for the input vector and 2*N neurons for the output vector. Each neuron for the output vector would have 2*N connections, one from each of the input vector neurons through one of the synapses.

It should be readily apparent that the accuracy of the DFT estimation is, in part, determined by the number of samples, "N". A larger sample space of the input signal corresponds to greater accuracy for the output spectrum. According to the well known Shannon's sampling criteria, "N" should be selected at twice the rate of the maximum frequency component of the input signal.

The forthcoming discussion discloses a resistive network for performing the DFT which may be realized from the aforedescribed synoptic weighting matrix $\omega$ as produced from the coefficients of the sum of products. As an introduction, a simplified schematic of resistive network 10 is shown in FIG. 1 to illustrate that a resistive network may be represented as a sum of products.

Resistive network 10 includes "N" number of input terminals. Voltages $V_{12}$, $V_{14}$, $V_{16}$ through $V_N$ are applied to inputs 12, 14, 16 and "N" of resistive network 10, respectively, and a voltage, $V_{18}$, is developed at output 18 in response thereto. The network is configured with resistor $R_{12'}$ coupled between input 12 and output 18, resistor $R_{14'}$ coupled between input 14 and output 18 and resistor $R_{16'}$ coupled between input 16 and output 18. The connection continues in a like manner through resistor $R_{N'}$ coupled between input "N" and output 18. In the output path, resistor $R_{18'}$ is coupled between output 18 and a power supply conductor typically operating at ground potential. Currents $I_{12}$, $I_{14}$ and $I_{16}$ then flow through resistors $R_{12'}$, $R_{14'}$ and $R_{16'}$ in response to voltages $V_{12}$, $V_{14}$ and $V_{16}$ respectively. Voltage $V_{18}$ is developed across resistor $R_{18'}$ at output 18 proportional to current $I_{18}$, which is the summation of currents $I_{12}$ through $I_N$. It is relatively easy to demonstrate that voltage $V_{18}$ may also be expressed in terms of the summation of ratios of the input voltages to the input resistors, $V_i/R_{i'}$, where "i" steps 12, 14, 16 through N, as follows:

$$V_{18} = [1 + \Sigma(R_{18'}/R_{i'})]^{-1} * R_{18'}(\Sigma V_i/R_{i'}) \quad (7)$$

Equation (7) may be simplified by selecting $R_{18'}$ much less than input resistors $R_{i'}$ thereby allowing the summation of $R_{18'}/R_{i'}$ to approach zero reducing equation (7) to:

$$V_{18} = R_{18'} * \Sigma(1/R_{i'} * V_i) \quad (8)$$

Relating equation (8) to the original equation (1) of the DFT, output column vector $F_n$ may be related to $V_{18}$ the latter of which is produced from a summation of signals (currents $I_{12}$ through $I_N$) expressed as products ($1/R_{i'}$) of the input signal ($V_i$). Thus, equation (8) may be treated as one element of output vector $F_n$ wherein $1/R_{i'}$ corresponds to one row of matrix $\omega$, input voltages $V_i$ are equal to the sampled input vector $f_k$ and $R_{18'}$ is an overall gain constant. The values of resistors $R_{i'}$ are inversely proportional to the row elements of matrix $\omega$, and as such are also inversely proportional to the coefficients of the sum of products estimation of the DFT. Hence, equation (8) provides the basis to realize the DFT using a multi-dimensional resistive network.

Figure 2:
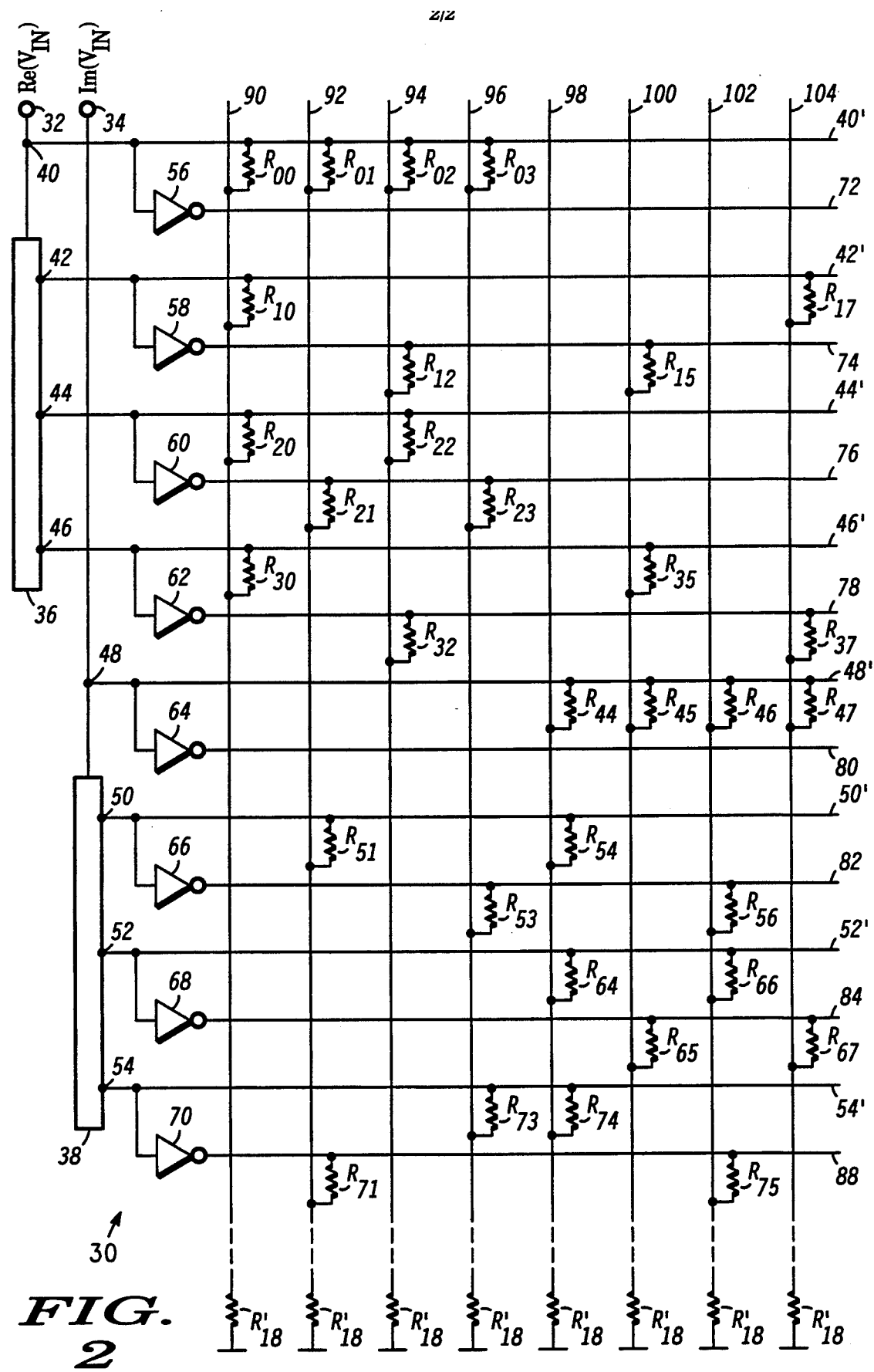
FIG. 2 is a diagram showing a particular implementation of the preferred embodiment of the present invention.

A 2-dimensional resistor network is shown in FIG. 2 of the present invention to illustrate a rank N=4 implementation of a DFT having four real processing channels and four imaginary processing channels. Resistor network 30 is responsive to input signal, $V_{IN}$, which is assumed to be a complex function of time, i.e., having real and imaginary components the latter of which are applied to inputs 32 and 34, respectively. Delay circuits 36 and 38 then delay the real and imaginary components of input signal $V_{IN}$ for predetermined increments of time. Delay circuit 36 includes tap points 40, 42, 44 and 46 for providing the spatial vector representation of the real component of length N=4. Delay circuit 38 includes tap points 48, 50, 52 and 54 for providing the spatial vector of the imaginary component of input signal $V_{IN}$. Assuming equal time delays, $t_d$, between each tap point, the spatial vector at tap points 40, 42, 44 and 46 may be expressed as $Re(V_{IN}(t_0))$, $Re(V_{IN}(t_0-t_d))$, $Re(V_{IN}(T_0-2t_d))$ and $Re(V_{IN}(T_0-3t_d))$, respectively, where $V_{IN}(t)$ is the value of input signal $V_{IN}$ evaluated at time t and $t_0$ is the non-delayed time value. Likewise, the spatial vector of the imaginary component at nodes 48, 50, 52 and 54 may be expressed as $Im(V_{IN}(t_0))$, $Im(V_{IN}(t_0-t_d))$, $Im(V_{IN}(t_0-2t_d))$ and $Im(V_{IN}(t_0-3t_d))$, respectively.

Conductors 40', 42', 44', 46', 48', 50', 52' and 54' extend from tap points 40-54, respectively. The inputs of inverters 56, 58, 60, 62, 64, 66, 68 and 70 are then coupled to conductors 40'-54' respectively, and the outputs of inverters 56-70 are coupled to conductors 72, 74, 76, 78, 80, 82, 84 and 86, respectively, wherein conductors 40'-54' and 72-86 typically run parallel to one another. Conductors 90, 92, 94, 96, 98, 100, 102 and 104 are routed in a manner typically perpendicular to conductors 40'-54' and 72-86 so as to provide a meshwork of conductors in which predetermined resistors $R_{nk}$ are coupled. The subscripts of $R_{nk}$, "n" and "k", are integers ranging from zero to seven corresponding to conductors 40'-54',72-86 and conductors 90-104, respectively. For example, resistor $R_{00}$ is coupled between conductor 40' or 72 (depending on the sign) and conductor 90.

Resistive network 10 demonstrates that a resistive network may be expressed as a sum of products, and as such it is representative of only the connection between one output conductor and the plurality of input conductors. In one case, resistive network 10 corresponds to the connection of resistors $R_{no}$ between conductor 90 and conductors 40'-54' and 72-86. The present invention includes the recognition that a complex transformation may also be represented as a sum of products and thereby be converted to a multi-dimensional matrix, the elements of which provide the values and connection scheme of a corresponding multi-dimensional resistive network for preforming the complex transform.

The predetermined location and value of resistor $R_{nk}$ in resistive network 30 is then extracted from the transpose of matrix $\omega$ of the sum of products estimation of equation (4). The technique of solving matrix $\omega$ for any "N" length spatial vector follows directly from the example of equations (2) through (5). More specifically, expanding equations (2) and (3) provides an "N" by "N" matrix of elements $\omega_{nk}$ wherein "n" and "k" are integers ranging from 0 to N−1. The value of resistor $R_{nk}$ is inversely proportional to $\omega_{nk}/N$ as shown in equation (8). The proportionality between a resistor and an element of matrix $\omega$ is determined by an independent common multiplier, "M", such that the actual value for resistor $R_{nk}$ is equal to $[(\omega_{nk}/N)^{-1} * M]$. Hence, because of the common multiplier "M", the actual value of resistor $R_{nk}$ selected for network 30 is dependent only upon a ratio to the other values of resistor matrix R. For example, the following table represents resistor matrix R formed of resistors $R_{nk}$ for the aforedescribed N=4 complex transformation:

TABLE 1

Solution of N = 4 resistor network 30

| $R_{nk}$: k = | 0 | 1 | 2 | 3 | 4 | 5 | 6 | 7 |
|---|---|---|---|---|---|---|---|---|
| n = 0 | 4 | 4 | 4 | 4 | * | * | * | * |
| 1 | 4 | * | −4 | * | * | −4 | * | 4 |
| 2 | 4 | −4 | 4 | −4 | * | * | * | * |
| 3 | 4 | * | −4 | * | * | 4 | * | −4 |
| 4 | * | * | * | * | 4 | 4 | 4 | 4 |
| 5 | * | 4 | * | −4 | 4 | * | −4 | * |
| 6 | * | * | * | * | 4 | −4 | 4 | −4 |
| 7 | * | −4 | * | 4 | 4 | * | −4 | * | where:
$R_{nk}$ = resistor value of row n, column k
* = infinite resistance.

Notably, the symmetry of matrix $\omega$ requires relatively few unique values for resistor $R_{nk}$.

Recallinq the previous evaluation of matrix $\omega$, $\omega_{nk}$ may be calculated from the original substitution of $\omega_{nk}=\cos(2\pi nk)-j\sin(2\pi nk)$. For example, $Re(\omega_{00})$ reduces to $\cos(0)=1$ and $Re(\omega_{12})$ becomes $\cos(4\pi)=-1$. Matrix $\omega$ is then commonly multiplied by ¼, and the resulting values are inverted and transposed to obtain the resistor matrix R showing the connection scheme and value of resistors $R_{nk}$. This provides a one-to-one correspondence between resistor matrix R and resistive network 30. For example, resistors $R_{00}$, $R_{10}$, $R_{20}$ and $R_{30}$ are coupled between common conductor 90 and conductors 40', 42', 44' and 46', respectively. The values for resistors $R_{00}$, $R_{10}$, $R_{20}$ and $R_{30}$ are each equal to 4*M wherein the common multiplier M may be any convenient value. Resistors $R_{40}$, $R_{50}$, $R_{60}$ and $R_{70}$ remain as opencircuits due to the infinite impedance for each value, although theoretically these resistors are coupled between conductors 90 and conductor 48-54 respectively. Negative resistor values, for example, resistors $R_{12}$ and $R_{32}$ are coupled between common conductor 94 and conductors 74 and 78 the latter ones of which provide signals having the opposite polarity with respect to the signals applied to conductors 2' and 46'.

The currents flowing in conductors 90-104 represent the spatial vector of the transformed output signal. For example, current $I_{90}$ flowing in conductor 90 is equal to the summation of the currents flowing in resistors $R_{00}$, $R_{10}$, $R_{20}$ and $R_{30}$ and, thus, equal to element $F_0$ of the output signal vector $F_n$. Likewise, elements $F_1$ through $F_7$ of the output signal vector $F_n$ are equal to currents flowing in conductors 92, 94, 96, 98, 100, 102 and 104, respectively.

Resistor $R_{18'}$ is coupled between node 18 and a power supply conductor typically operating at ground potential. Conductors 90-104 may be coupled to node 18 for providing a single output signal representative of the transformed output vector $F_n$. Alternately, conductors 90-104 may be coupled to the inputs of another resistive network, corresponding to inputs 40-54 of resistive network 30, for providing yet another layer of transformation. The complex transformation of a secondary layer need not be the same as the transformation of the preceding layer. This expansion may be continued to as many layers as required to achieve the desired signal processing.

The source code of a Fortran program is provided in Appendix A for calculating resistor matrix R for a DFT of rank $N \leq 2048$. The program resolves the sum of products estimation into a matrix notation and calculates and transposes elements from the original matrix $\omega$ into resistor matrix R. Higher rank transformations may be obtained with appropriate modification of the array dimensions.

Hence, what has been described is a novel technique utilizing a resistive network for performing a parallel complex transformation of the spatial vector of an input signal.

APPENDIX A

```
program DFT_gen
common /fgendata/ nrank,f(2048,2048)
twopi = 2 * 3.1415927
5 continue
  write(6,*)'Enter RANK: '
  read(5,*)nrank
  if(nrank.gt.1024) go to 5
  n = nrank - 1
  k = nrank - 1
  oneoverN = 1.0/nrank
  xnrank = nrank
  do 10 i=0,n
  do 10 j=0,k
     xi = i
     xj = j
     temp = twopi * ( xi*xj / xnrank)
     f(i+1, j+1)               = oneoverN * (  cos(temp))
     f(nrank+i+1, j+1)         = oneoverN * (+sin(temp))
     f(i+1, nrank+j+1)         = oneoverN * (-sin(temp))
     f(nrank+i+1, nrank+j+1)   = oneoverN * (  cos(temp))
10 continue
  call format1
  do 15 i=0,n
  do 15 j=0,k
     xi = i
     xj = j
     temp = twopi * ( xi*xj / xnrank)
     f(i+1, j+1)               =   cos(temp)
     f(nrank+i+1, j+1)         = -sin(temp)
     f(i+1, nrank+j+1)         = +sin(temp)
     f(nrank+i+1, nrank+j+1)   =   cos(temp)
15 continue
  write(6,*)
  write(6,*)'Inverse:'
  write(6,*)
  call format1
  end
  subroutine format1
  common /fgendata/ nrank,f(2048,2048),m(2048,2048),
+ s(2048,2048)
  dimension value(100)
  character*1 s
  do 10 i=1,100
     value(i) = -5.0
10 continue
  do 20 i=1,2*nrank
  do 20 j=1,2*nrank
    do 30 k=1,100
       s(i,j)=' '
       if(f(i,j).lt.0.0)s(i,j)='-'
       if(abs(f(i,j)).le-6) f(i,j) = 0.0
       if (value(k).eg.-5.0)then
          value(k) = f(i,j)
          lastval=k
          m(i,j)=k
          go to 20
       else
          if(abs(abs(f(i,j))-abs(value(k))) .lt. .0001)
    then
          m(i,j)=k
          go to 20
          endif
       endif
30  continue
20 continue
  do 60 i=1,100
     if(abs(value(i)).lt.le-20)value(i)=le-20
60 continue
```

APPENDIX A -continued

```
  write(6,4)('R',i,1.0/value(i),i=1,lastval)
4 format(/'Resistor values (where X is an arbitrary
+ multiplier):'/100(al,i1,2x,f10.5,'X'/))
  write(6,3)
3 format(//'Resistor matrix in chip layout form:'//)
  do 50 i=1,2*nrank
     write(6,1) (s(j,i),'R',m(j,i),j=1,2*nrank)
1    format(100(2al,il,1x)
  write(6,2)
50 continue
  write(6,2)
2 format(/)
  return
  end
```

I claim:

1. An apparatus responsive to a spatial vector input signal applied at a plurality of inputs for providing a complex signal transformation thereof at a plurality of outputs, comprising:
   a plurality of first conductors respectively coupled to the plurality of inputs of the apparatus for conducting elements of the spatial vector input signal in a positive sense;
   a plurality of inverters each having an input and an output, said inputs of said plurality of inverters being respectively coupled to the plurality of inputs of the apparatus;
   a plurality of second conductors respectively coupled to said outputs of said plurality of inverters for conducting said elements of the spatial vector input signal in a negative sense;
   a plurality of third conductor respectively coupled to the plurality of outputs of the apparatus; and
   a plurality of resistors having predetermined values and a predetermined connection scheme between said plurality of first conductors and said plurality of third conductors and between said plurality of second conductors and said plurality of third conductors, wherein said predetermined connection scheme and said predetermined values of said plurality of resistors are determined from a matrix representation of the sum of the products coefficients of the complex signal transformation.

2. The apparatus of claim 1 wherein said plurality of resistors includes a first resistor having first and second terminals and having a predetermined value, said first terminal of said first resistor being coupled to a respective one of said plurality of first conductors, said second terminal of said first resistor being coupled to a first respective one of said plurality of third conductors for propagating a first element of the spatial vector input signal in a positive sense.

3. The apparatus of claim 2 wherein said plurality of resistors includes a second resistor having first and second terminals and having a predetermined value, said first terminal of said second resistor being coupled to a respective one of said plurality of second conductors, said second terminal of said second resistor being coupled to a second respective one of said plurality of third conductors for propagating a second element the spatial vector input signal in a negative sense.

4. The apparatus of claim 3 wherein said predetermined values of said plurality of resistors are inversely proportional to the corresponding values of said matrix representation of said sum of the products coefficients.

5. The apparatus of claim 4 wherein said proportionality between said predetermined values of said plurality of resistors and the corresponding values of said matrix representation of said sum of the products coefficients is constant.

6. A resistive network for providing the discrete Fourier transform of an input signal at an output thereof, comprising:

first means responsive to the input signal and having a plurality of tap points for providing a signal vector representation of the state space of the input signal;

a plurality of first conductors respectively coupled for receiving elements of said signal vector;

a plurality of inverters each having an input and an output, said inputs of said plurality of inverters being respectively coupled for receiving said elements of said signal vector for providing inverted elements of said signal vector at said outputs of said plurality of inverters;

a plurality of second conductors respectively coupled to said outputs of said plurality of inverters for conducting said inverted elements of said signal vector;

a plurality of third conductors respectively coupled to the output of the resistive network; and a plurality of resistors having predetermined values and a predetermined connection scheme between said plurality of first conductors and said plurality of third conductors and between said plurality of second conductors and said plurality of third conductors, wherein said predetermined connection scheme and said predetermined values of said plurality of resistors are determined from a matrix representation of the sum of the products coefficients of the complex signal transformation.

7. The apparatus of claim 6 wherein said plurality of resistors includes a first resistor having first and second terminals and having a predetermined value, said first terminal of said first resistor being coupled to a respective one of said plurality of first conductors, said second terminal of said first resistor being coupled to a first respective one of said plurality of third conductors for propagating the spatial vector input signal in a positive sense.

8. The apparatus of claim 7 wherein said plurality of resistors includes a second resistor having first and second terminals and having a predetermined value, said first terminal of said second resistor being coupled to a respective one of said plurality of second conductors, said second terminal of said second resistor being coupled to a second respective one of said plurality of third conductors for propagating the spatial vector input signal in a negative sense.

9. The apparatus of claim 8 wherein said predetermined values of said plurality of resistors are inversely proportional to the corresponding values of said matrix representation of said sum of the products coefficients.

10. The apparatus of claim 9 wherein said proportionality between said predetermined values of said plurality of resistors and the corresponding values of said matrix representation of said sum of the products coefficients is constant.

11. A method of providing a complex transformation of an input signal vector at a plurality of outputs of a resistive network wherein the resistive network includes a plurality of first conductors for propagating elements of the input signal vector, a plurality of second conductors for propagating inverted elements of the input signal vector, a plurality of third conductors and a plurality of resistors having predetermined values and a predetermined connection scheme between the plurality of first conductors and the plurality of third conductors and between the plurality of second conductors and the plurality of third conductors, comprising the steps of:

applying a plurality of voltages to the plurality of first conductors as the elements of the input signal vector;

inverting each of said plurality of voltages for providing a plurality of inverted voltages;

applying said plurality of inverted voltages to the plurality of second conductors;

converting said plurality of voltages and said plurality of inverted voltages to a plurality of currents flowing through said plurality of resistors; and summing said plurality of currents into said plurality of third conductors for providing a spatial vector output signal proportional to the complex transformation of the input signal.

* * * * *